(12) United States Patent
Bi et al.

(10) Patent No.: US 9,866,154 B2
(45) Date of Patent: Jan. 9, 2018

(54) DRIVE SYSTEM FOR INDUCTION MOTOR

(71) Applicant: FORTIOR TECHNOLOGY (SHEN-ZHEN) CO., LTD, Shenzhen, Guangdong (CN)

(72) Inventors: Chao Bi, Guangdong (CN); Lei Bi, Guangdong (CN)

(73) Assignee: FORTIOR TECHNOLOGY (SHEN-ZHEN) CO., LTD, Shenzhen (CN)

( * ) Notice: Subject to any disclaimer, the term of this patent is extended or adjusted under 35 U.S.C. 154(b) by 0 days.

(21) Appl. No.: 15/409,552

(22) Filed: Jan. 19, 2017

(65) Prior Publication Data
US 2017/0194884 A1    Jul. 6, 2017

Related U.S. Application Data

(63) Continuation of application No. PCT/CN2016/080329, filed on Apr. 27, 2016.

(30) Foreign Application Priority Data

Dec. 31, 2015    (CN) .................... 2015 2 1138871 U

(51) Int. Cl.
| H02P 1/26 | (2006.01) |
| H02P 1/42 | (2006.01) |
| H02P 3/18 | (2006.01) |
| H02P 6/08 | (2016.01) |
| H02K 17/12 | (2006.01) |

(52) U.S. Cl.
CPC ............ *H02P 6/085* (2013.01); *H02K 17/12* (2013.01)

(58) Field of Classification Search
CPC .................................. H02P 6/085; H02P 27/08
USPC .......................................................... 318/767
See application file for complete search history.

(56) References Cited

U.S. PATENT DOCUMENTS

| 4,520,296 A | 5/1985 | Lepper et al. |
| 5,784,270 A * | 7/1998 | Permuy .................... H02P 7/04 |
| | | 363/132 |

(Continued)

FOREIGN PATENT DOCUMENTS

| CN | 102844971 A | 12/2012 |
| CN | 105429553 A | 3/2016 |

(Continued)

OTHER PUBLICATIONS

International Search Report of PCT Patent Application No. PCT/CN2016/080329 dated Sep. 21, 2016.

*Primary Examiner* — Erick Glass

(57) ABSTRACT

Disclosed is a drive system for induction motor, including a two-phase induction motor, a power source filter circuit, an H-bridge power drive circuit and a controller MCU. The power source filter circuit is configured to filter out harmonic components of a DC power source, and generate a power source midpoint voltage required for driving; the controller MCU is configured to generate a switch control signal required for operation of the H-bridge power drive circuit; the H-bridge power drive circuit is configured to generate a drive current and transfer the drive current to the two-phase induction motor; and the two-phase induction motor is configured to receive the drive current generated by the H-bridge power drive circuit.

8 Claims, 2 Drawing Sheets

(56) References Cited

U.S. PATENT DOCUMENTS

| | | | | |
|---|---|---|---|---|
| 5,847,521 A * | 12/1998 | Morikawa | ........... | H02P 6/34 318/400.01 |
| 5,977,737 A * | 11/1999 | Labriola, II | ........... | G05B 11/28 318/560 |
| 6,066,930 A * | 5/2000 | Horiguchi | ........... | H02P 7/04 318/400.29 |
| 6,163,341 A * | 12/2000 | Kawaguchi | ........... | G02B 7/102 348/240.3 |
| 6,404,655 B1 * | 6/2002 | Welches | ........... | H02M 7/4807 363/17 |
| 7,902,776 B2 * | 3/2011 | Karwath | ........... | H02P 6/18 318/400.07 |

FOREIGN PATENT DOCUMENTS

| | | | |
|---|---|---|---|
| DE | 2445540 | A1 | 4/1976 |
| DE | 2804791 | A1 | 8/1979 |

\* cited by examiner

DRIVE SYSTEM FOR INDUCTION MOTOR

CROSS REFERENCE TO RELATED APPLICATIONS

The present application is a Continuation Application of PCT application No. PCT/CN2016/080329 filed on Apr. 27, 2016, which claims the benefit of Chinese Patent Application No. 201521138871.6 filed on Dec. 31, 2015. All the above are hereby incorporated by reference.

TECHNICAL FIELD

The present disclosure relates to the field of induction motor driving techniques, and in particular to a drive system for an induction motor.

BACKGROUND

When a single-phase induction motor is designed, a magnetic field in the airgap of the motor can be designed to be distributed circularly only at a certain rotation speed. For example, if particular attention is paid to the starting property of the motor, the magnetic field in the airgap of the motor can be designed to be distributed circularly at starting state, but this will result in an elliptical magnetic field during operation; if emphasis is placed upon operation property, the airgap magnetic field at the rated speed can be designed to be circular, but this will result in an elliptical magnetic field during starting of the motor. The elliptical magnetic field will lead to additional loss and noise, which are undesired when the motor is used. That's way the application of single-phase motor is limited, for example in occasions where speed regulation is required.

For multi-phase induction motors including two-phase induction motors, when multi-phase driving voltages are symmetrical, the motor has a circular airgap magnetic field at all rotation speeds so that the motor has characteristics such as high efficiency, silence and high power density. For the multi-phase induction motor, if variable frequency speed regulation is adopted, speed regulation can be perform within a wide range and the efficiency is high. In order to drive a two-phase induction motor or other motors having an even number of phases, 4M number of power semiconductor transistors are required to form a multi-phase bridge, and 2M number of power semiconductor transistors are required to form a multi-phase bridge when there are an odd number of phases. Thus, multiple channels of control signals are required to perform chopping control on these power semiconductor transistors, so as to form multi-phase symmetrical driving currents. All of the above makes the structure of the drive circuit to be complicated, the calculation of the control signal to be difficult, the reliability of the starting system to be poor and the cost of the drive system to be high, which limits the application of motors such as two-phase induction motors.

SUMMARY

In view of the above, the present disclosure is intended to provide a drive system for an induction motor.

To this end, the technical solutions of the disclosure are implemented as follows.

An embodiment of the present disclosure provides a drive system for an induction motor, including a two-phase induction motor, a power source filter circuit, an H-bridge power drive circuit and a controller MCU, in which:

the power source filter circuit is configured to filter out harmonic components of a Direct Current (DC) power source, and generate a power source midpoint voltage required for driving;

the controller MCU is configured to generate a switch control signal required for operation of the H-bridge power drive circuit;

the H-bridge power drive circuit is configured to generate a drive current and transfer the drive current to the two-phase induction motor; and the two-phase induction motor is configured to receive the drive current generated by the H-bridge power drive circuit.

In the above solution, the power source filter circuit comprises a double-filtering capacitor C0 and a double-filtering capacitor C1 connected in series, one end of the power source filter circuit is connected to the DC power source and the other end of the power source filter circuit is connected to the ground.

In the above solution, a sampling resistor RS0 is connected between the double-filtering capacitor C1 and the ground.

In the above solution, the double-filtering capacitor C0 and the double-filtering capacitor C1 are of the same capacitance.

In the above solution, the H-bridge power drive circuit comprises an H bridge consisting of a power semiconductor transistor Q1, a power semiconductor transistor Q2, a power semiconductor transistor Q3 and a power semiconductor transistor Q4, a drain of the power semiconductor transistor Q1 is connected to an output of the DC power source, a source of the power semiconductor transistor Q1 is connected to a drain of the MOS transistor Q3 to form a bridge arm endpoint U, a source of the power semiconductor transistor Q3 is connected to the ground, and a gate of the power semiconductor transistor Q1 and a gate of the power semiconductor transistor Q3 are connected respectively to the controller MCU; a drain of the power semiconductor transistor Q2 is connected to the output of the DC power source, a source of the power semiconductor transistor Q2 is connected to a drain of the power semiconductor transistor Q4 to form a bridge arm endpoint V, a source of the power semiconductor transistor Q4 is connected to the ground, and a gate of the power semiconductor transistor Q2 and a gate of the power semiconductor transistor Q4 are connected respectively to the controller MCU.

In the above solution, a middle point between a winding L1 and a winding L2 of the two-phase induction motor is connected to a middle point N of the power source, and an endpoint of the winding L1 and an endpoint of the winding L2 are connected respectively to the bridge arm endpoint U and the bridge arm endpoint V.

In the above solution, the system further includes a resistor R1, a resistor R3, a resistor R5, a resistor R7, a resistor R2, a resistor R4, a resistor R6 and a resistor R8, herein the resistor R1, the resistor R2, the resistor R5 and the resistor R6 are arranged respectively between the controller MCU and a respective gate of the power semiconductor transistor Q1, the power semiconductor transistor Q2, the power semiconductor transistor Q3 and the power semiconductor transistor Q4; and the resistor R3, the resistor R4, the resistor R7 and the resistor R8 are arranged respectively between a respective gate and a respective source of the power semiconductor transistor Q1, the power semiconductor transistor Q2, the power semiconductor transistor Q3 and the power semiconductor transistor Q4.

Compared to the prior art, beneficial effects of the disclosure are as follows.

When a motor has an even number of phases, the number of power semiconductor devices in the disclosure can be reduced by 50%, the possibility of over current due to malfunctions of power semiconductors is reduced considerably, and the reliability can be improved; since the airgap magnetic field is always circular during operation of the motor, efficiency of the motor is improved, the speed regulation range is broadened and the noise is reduced, thereby extending application range of the induction motor.

DETAILED DESCRIPTION

In order to make the objectives, technical solutions and advantages of the disclosure be more clear, the disclosure will be further elaborated below in combination with the accompanying drawings and embodiments. It should be understood that the specific embodiments are only used to interpret the disclosure instead of limiting the disclosure.

Figure 1:
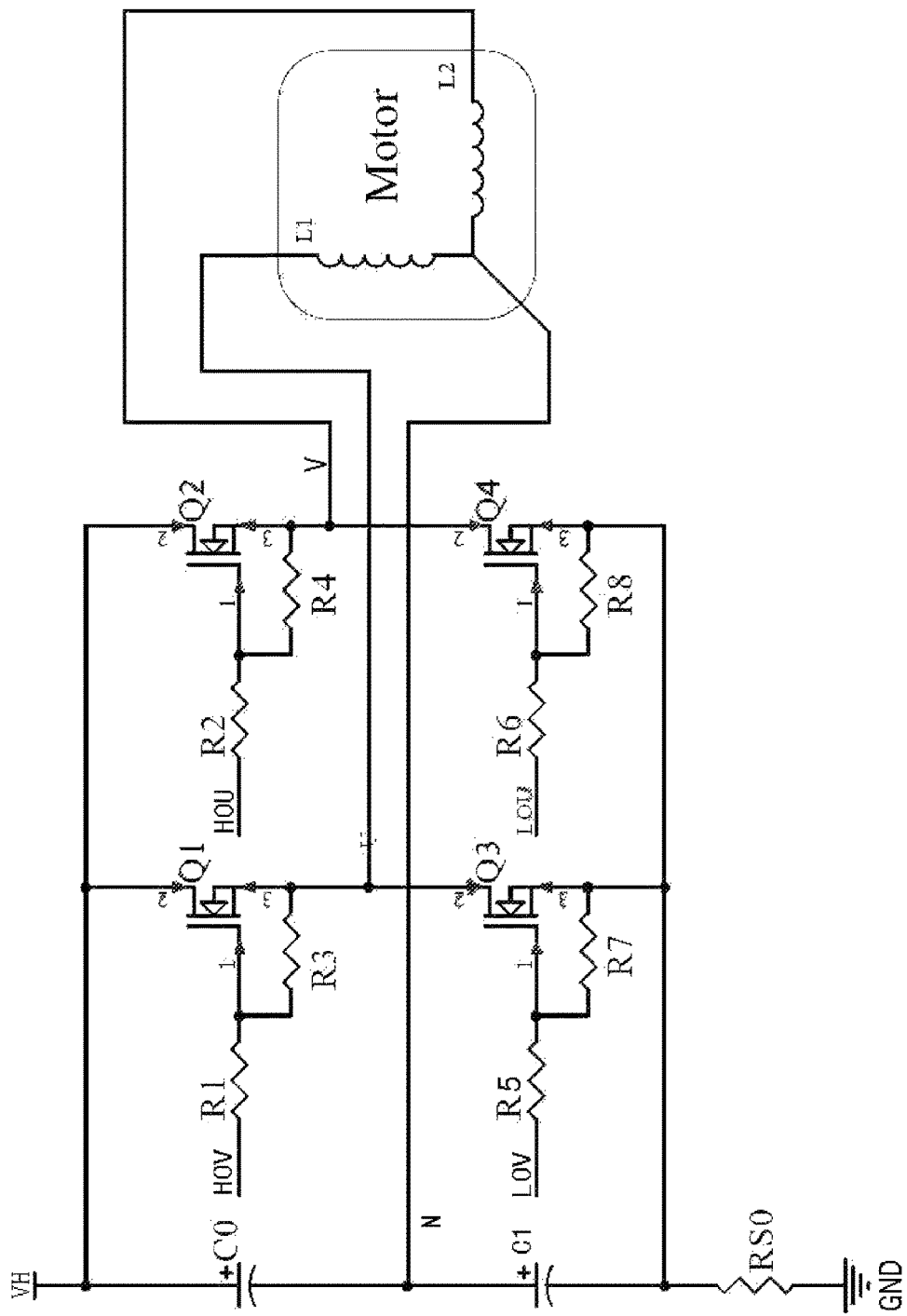
FIG. 1 is a schematic circuit diagram of a drive system for an induction motor according to an embodiment of the disclosure.

An embodiment of the present disclosure provides a drive system for an induction motor. As shown in FIG. 1, the system includes a two-phase induction motor, a power source filter circuit, an H-bridge power drive circuit and a controller MCU, in which:

the power source filter circuit is configured to filter out harmonic components of a Direct Current (DC) power source, and generate a power source midpoint voltage required for driving;

the controller MCU is configured to generate a switch control signal required for operation of the H-bridge power drive circuit;

Specifically, parameters are input according to the control requirements of the system, switching signals of four power semiconductor devices of the H bridge are calculated in time domain to generate amplitude and frequency of the desired driving voltage and rotation direction of the magnetic field, and thus generates desired two-phase symmetrical driving currents.

When the controller MCU performs switching control on four power semiconductor devices of the H bridge, in an electrical cycle, each power semiconductor device operates only in half of the cycle, thus the power semiconductor device has relatively small loss, the heating of the device is improved, and the possibility of short circuit of a power transistor due to an error of the control signal is reduced considerably.

The H-bridge power drive circuit is configured to generate a drive current and transfer the drive current to the two-phase induction motor; and the two-phase induction motor is configured to receive the drive current generated by the H-bridge power drive circuit.

The power source filter circuit comprises a double-filtering capacitor C0 and a double-filtering capacitor C1 connected in series, one end of the power source filter circuit is connected to the DC power source and the other end of the power source filter circuit is connected to the ground; the double-filtering capacitor C0 and the double-filtering capacitor C1 are of the same inductance.

A sampling resistor RS0 is connected between the double-filtering capacitor C1 and the ground.

The H-bridge power drive circuit comprises an H bridge consisting of a power semiconductor transistor Q1, a power semiconductor transistor Q2, a power semiconductor transistor Q3 and a power semiconductor transistor Q4, a drain of the power semiconductor transistor Q1 is connected to an output of the DC power source, a source of the power semiconductor transistor Q1 is connected to a drain of the MOS transistor Q3 to form a bridge arm endpoint U, a source of the power semiconductor transistor Q3 is connected to the ground, and a gate of the power semiconductor transistor Q1 and a gate of the power semiconductor transistor Q3 are connected respectively to the controller MCU; a drain of the power semiconductor transistor Q2 is connected to the output of the DC power source, a source of the power semiconductor transistor Q2 is connected to a drain of the power semiconductor transistor Q4 to form a bridge arm endpoint V, a source of the power semiconductor transistor Q4 is connected to the ground, and a gate of the power semiconductor transistor Q2 and a gate of the power semiconductor transistor Q4 are connected respectively to the controller MCU; an upper switching tube of the bridge arm and a lower switching tube of the H-bridge power drive circuit are connected to the controller MCU, and the controller MCU generates a PWM signal to control closing and opening of the upper switching tube and the lower switching tube; and the upper switching tube and the lower switching tube are closed during different period of time.

A middle point between a winding L1 and a winding L2 of the two-phase induction motor is connected to a middle point N of the power source, and an endpoint of the winding L1 and an endpoint of the winding L2 are connected respectively to the bridge arm endpoint U and the bridge arm endpoint V.

The system further includes a resistor R1, a resistor R3, a resistor R5, a resistor R7, a resistor R2, a resistor R4, a resistor R6 and a resistor R8, herein the resistor R1, the resistor R2, the resistor R5 and the resistor R6 are arranged respectively between the controller MCU and a respective gate of the power semiconductor transistor Q1, the power semiconductor transistor Q2, the power semiconductor transistor Q3 and the power semiconductor transistor Q4; and the resistor R3, the resistor R4, the resistor R7 and the resistor R8 are arranged respectively between a respective gate and a respective source of the power semiconductor transistor Q1, the power semiconductor transistor Q2, the power semiconductor transistor Q3 and the power semiconductor transistor Q4.

Figure 2:
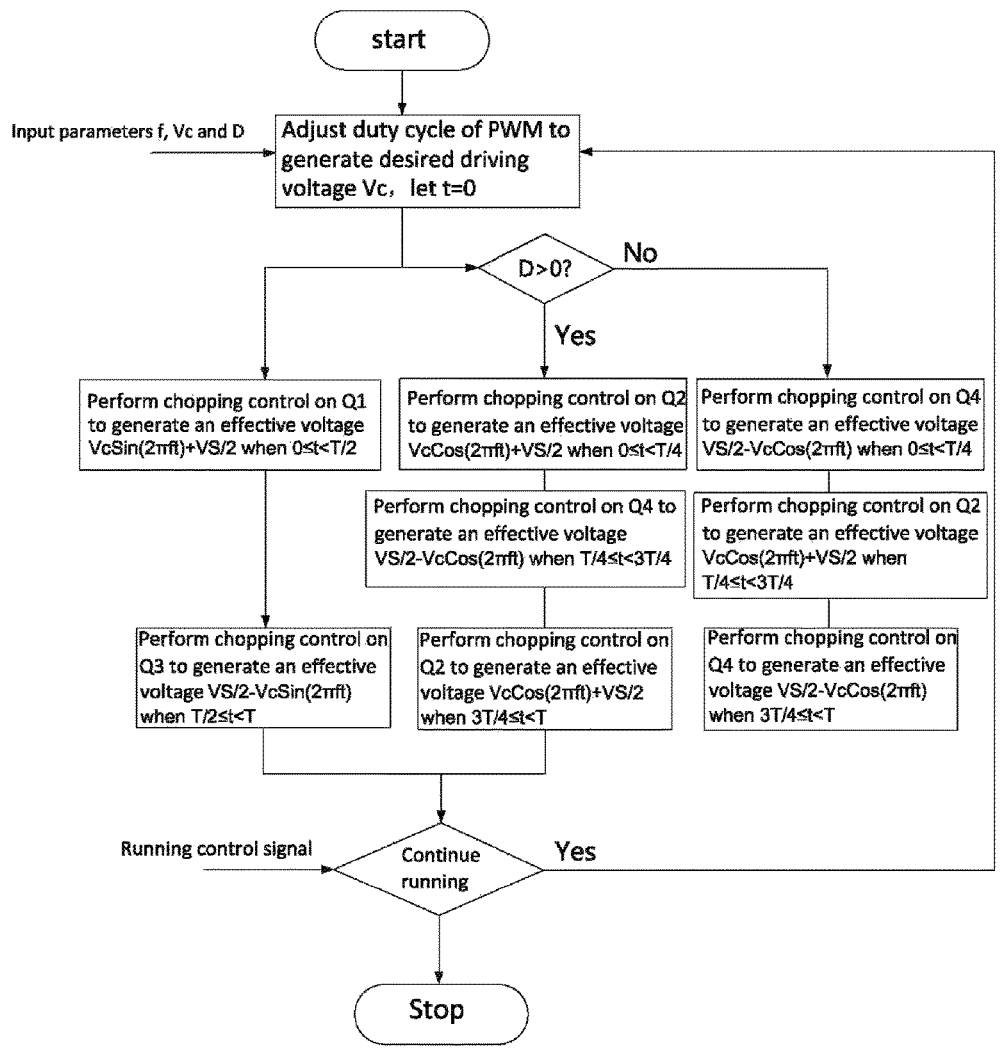
FIG. 2 is a flow chart showing a control process of a controller of a drive system for an induction motor according to an embodiment of the disclosure.

According to the process shown in FIG. 2, the controller MCU generates a PWM control signal for four power semiconductor devices Q1, Q2, Q3 and Q4 in the H-bridge power drive circuit.

Step 1: the system is started;

Step 2: drive parameters of a motor are input, including the frequency f of a voltage (the time period value of a current: $T=1/f$), voltage amplitude $V_C$, and a running direction D of the motor;

Step 3: an initial value $t=0$ of running time is set, then proceed to step 4 and step 9;

Step 4: if the motor is required to rotate in a forward direction (i.e., a state of D>0 in FIG. 2), proceed to Step 5; otherwise, proceed to Step 7;

Step 5: when $0 \leq t < T/2$, chopping control is performed on Q1 so that port U of the H bridge generates an effective voltage $V_C \sin(2\pi ft)+V_H/2$; in this period of time, Q3 is in an off state, or runs according to the logic "NOT" of the state of Q1. When T/2≤t<T, chopping is performed on Q3 so that port U of the H bridge generates an effective voltage $V_H/2-V_c \sin(2\pi ft)$; in this period of time, Q1 is in an off state, or runs according to the logic "NOT" of the state of Q3.

Step 6: t≥T, proceed to Step 10.

Step 7: when 0≤t<T/2, chopping control is performed on Q3 so that port U of the H bridge generates an effective voltage $V_H/2-V_c \sin(2\pi ft)$; in this period of time, Q1 is in an off state, or runs according to the logic "NOT" of the state of Q3; when T/2≤t<T, chopping is performed on Q1 so that port U of the H bridge generates an effective voltage $V_c \sin(2\pi ft)+V_H/2$; in this period of time, Q3 is in an off state, or runs according to the logic "NOT" of the state of Q1.

Step 8: t≥T, proceed to Step 10.

Step 9: when 0≤t<T/4, chopping control is performed on Q2 so that port V of the H bridge generates an effective voltage $V_c \cos(2\pi ft)+V_H/2$; in this period of time, Q4 is in an off state, or runs according to the logic "NOT" of the state of Q2. Step 7: when T/4≤t<3T/4, chopping is performed on Q4 so that port V of the H bridge generates an effective voltage $V_H/2-V_c \cos(2\pi ft)$; in this period of time, Q2 is in an off state, or runs according to the logic "NOT" of the state of Q4; when 3T/4≤t<T, chopping is performed on Q2 so that port V of the H bridge generates an effective voltage $V_c \cos(2\pi ft)+V_H/2$; in this period of time, Q4 is in an off state, or runs according to the logic "NOT" of the state of Q2. t≥T, proceed to Step 10

Step 10: according to a control instruction, if running is required to be continued, proceed to step 2, otherwise, the running ends.

In the above running process, a U arm consisting of Q1 and Q3 and a V arm consisting of Q2 and Q4 run independently, and on a same arm, the ON time of one power semiconductor is orthogonal to the ON time of another power semiconductor. In the case of orthogonality, a possibility of short circuit of a power transistor due to an error of the control signal can be reduced considerably. In addition, on a same arm, the ON time of each power semiconductor can be only 50%, which means that switching loss can be reduced by 50% and heating of the driver can be reduced apparently. The effective driving voltages generated at U and V of the H bridge are symmetrical and orthogonal, and being driven by these voltages, currents in two-phase windings are sinusoidal and orthogonal; therefore, the airgap magnetic field of the two-phase motor can always be circular, and the motor is enabled to always operate in a high efficient state with relatively low noise. In cases where load characteristics of a motor is known, by proper selection of f and $V_c$, the motor can be enabled to operate under optimal conditions with different rotation speeds, and the system can be easily and conveniently implemented, and has good stability, small loss and low implementation cost.

What described are merely preferable embodiments of the disclosure, and are not intended to limit the disclosure.

The invention claimed is:

1. A drive system for induction motor, comprising a two-phase induction motor, a power source filter circuit, an H-bridge power drive circuit and a controller MCU,
wherein the power source filter circuit is configured to filter out harmonic components of a Direct Current (DC) power source, and generate a power source midpoint voltage required for driving;
the controller MCU is configured to generate a switch control signal required for operation of the H-bridge power drive circuit;
the H-bridge power drive circuit is configured to generate a drive current and transfer the drive current to the two-phase induction motor;
the H-bridge power drive circuit comprises an H bridge consisting of a power semiconductor transistor Q1, a power semiconductor transistor Q2, a power semiconductor transistor Q3 and a power semiconductor transistor Q4;
a drain of the power semiconductor transistor Q1 is connected to an output of the DC power source, a source of the power semiconductor transistor Q1 is connected to a drain of the power semiconductor transistor Q3 to form a bridge arm endpoint U, a source of the power semiconductor transistor Q3 is connected to ground, and a gate of the power semiconductor transistor Q1 and a gate of the power semiconductor transistor Q3 are connected respectively to the controller MCU, a drain of the power semiconductor transistor Q2 is connected to the output of the DC power source, a source of the power semiconductor transistor Q2 is connected to a drain of the power semiconductor transistor Q4 to form a bridge arm endpoint V, a source of the power semiconductor transistor Q4 is connected to the ground, and a gate of the power semiconductor transistor Q2 and a gate of the power semiconductor transistor Q4 are connected respectively to the controller MCU;
one endpoint of a winding L1 of the two-phase induction motor is connected to one endpoint of another winding L2 of the two-phase induction motor to form a middle point;
the middle point of the two phase windings is connected to the middle point of a capacitor C0 and a capacitor C1; the capacitor C0 and the capacitor C1 are configured to filter out the current harmonics of the DC power source, and form the middle point of the DC power source;
an endpoint of the winding L1 is connected to the bridge arm endpoint U and an endpoint of the winding L2 is connected to the bridge arm endpoint V; and
the two-phase induction motor is thus configured to receive the drive current generated by the H-bridge power drive circuit.

2. The drive system for induction motor according to claim 1, wherein each of the capacitors C0 and C1 is a double-filtering capacitor, the double-filtering capacitor C0 and the double-filtering capacitor C1 are connected in series, one end of the power source filter circuit is connected to the DC power source and the other end of the power source filter circuit is connected to the ground.

3. The drive system for induction motor according to claim 2, wherein a sampling resistor RS0 is connected between the double-filtering capacitor C1 and the ground.

4. The drive system for induction motor according to claim 2, wherein the double-filtering capacitor C0 and the double-filtering capacitor C1 are of the same capacitance.

5. The drive system for induction motor according to claim 2, wherein the middle point between the winding L1 and the winding L2 of the two-phase induction motor is connected to a middle point N of the power source formed by C0 and C1.

6. The drive system for induction motor according to claim 5, further comprising a resistor R1, a resistor R3, a resistor R5, a resistor R7, a resistor R2, a resistor R4, a resistor R6 and a resistor R8, wherein the resistor R1, the resistor R2, the resistor R5 and the resistor R6 are arranged respectively between the controller MCU and a respective gate of the power semiconductor transistor Q1, the power semiconductor transistor Q2, the power semiconductor transistor Q3 and the power semiconductor transistor Q4; and the resistor R3, the resistor R4, the resistor R7 and the resistor R8 are arranged respectively between a respective gate and a respective source of the power semiconductor transistor Q1, the power semiconductor transistor Q2, the power semiconductor transistor Q3 and the power semiconductor transistor Q4.

7. The drive system for induction motor according to claim 1, wherein the middle point between the winding L1 and the winding L2 of the two-phase induction motor is connected to a middle point N of the power source.

8. The drive system for induction motor according to claim 7, further comprising a resistor R1, a resistor R3, a resistor R5, a resistor R7, a resistor R2, a resistor R4, a resistor R6 and a resistor R8, wherein the resistor R1, the resistor R2, the resistor R5 and the resistor R6 are arranged respectively between the controller MCU and a respective gate of the power semiconductor transistor Q1, the power semiconductor transistor Q2, the power semiconductor transistor Q3 and the power semiconductor transistor Q4; and the resistor R3, the resistor R4, the resistor R7 and the resistor R8 are arranged respectively between a respective gate and a respective source of the power semiconductor transistor Q1, the power semiconductor transistor Q2, the power semiconductor transistor Q3 and the power semiconductor transistor Q4.

* * * * *